US008551574B2

(12) United States Patent
Desai et al.

(10) Patent No.: US 8,551,574 B2
(45) Date of Patent: Oct. 8, 2013

(54) METHOD OF GRAVURE PRINTING ELASTOMERIC COMPOSITIONS

(75) Inventors: Fred Naval Desai, Fairfield, OH (US); Urmish Popatlal Dalal, Milford, OH (US); Mark William Hamersky, Indian Springs, OH (US); Steven Daryl Smith, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 1664 days.

(21) Appl. No.: 11/081,138

(22) Filed: Mar. 16, 2005

(65) Prior Publication Data

US 2005/0214461 A1 Sep. 29, 2005

Related U.S. Application Data

(60) Provisional application No. 60/557,245, filed on Mar. 29, 2004.

(51) Int. Cl.

| | |
|---|---|
| ***D01D 10/00*** | (2006.01) |
| ***B05D 5/00*** | (2006.01) |
| ***B29C 65/00*** | (2006.01) |
| ***B32B 37/00*** | (2006.01) |
| ***B05C 1/08*** | (2006.01) |

(52) U.S. Cl.

USPC ........ 427/428.06; 156/229; 156/60; 156/549; 264/173.1; 604/385.13; 427/256; 427/428.01; 427/428.18; 118/211; 118/212; 118/667

(58) Field of Classification Search

USPC .................. 264/173.1; 604/385.13; 156/60, 156/229; 427/256, 428.06

See application file for complete search history.

(56) References Cited

U.S. PATENT DOCUMENTS

| | | | | |
|---|---|---|---|---|
| 3,981,838 | A | 9/1976 | Wilson | |
| 4,212,787 | A * | 7/1980 | Matsuda et al. | 525/211 |
| 4,223,059 | A | 9/1980 | Schwarz | |
| 4,618,630 | A * | 10/1986 | Knobel et al. | 524/295 |
| 5,026,450 | A * | 6/1991 | Cucuzza et al. | 156/244.11 |
| 5,085,655 | A * | 2/1992 | Mann et al. | 604/389 |

(Continued)

FOREIGN PATENT DOCUMENTS

| | | | |
|---|---|---|---|
| EP | 1022322 | A1 * | 7/2000 |
| WO | WO 01/87213 | A1 | 11/2001 |

(Continued)

*Primary Examiner* — Timothy Meeks
*Assistant Examiner* — Mandy C Louie
(74) *Attorney, Agent, or Firm* — Andrew A Paul; John P. Colbert; Dara M. Kendall

(57) ABSTRACT

The present invention relates to a process of manufacturing a stretch composite, said method comprising: a) providing a first substrate in a machine direction, wherein said substrate has opposing first and second surfaces; b) providing a gravure printing roll having an exterior surface that comprises one or more cells wherein at least a portion of the surface is relatively cool; c) depositing a molten, non-adhesive, elastomeric composition onto the exterior surface of the gravure printing device which comprises a gravure printing roll, wherein said composition is characterized as having a peel force of less than about 3 N/cm; d) causing said composition to be pushed into said cells; and e) contacting said first surface of said substrate with said gravure printing roll and substantially completely transferring said elastomeric composition from said cells of said exterior surface on said gravure printing roll to said first surface; wherein said process is substantially free of tackifier.

20 Claims, 4 Drawing Sheets

(56) References Cited

U.S. PATENT DOCUMENTS

| | | | | |
|---|---|---|---|---|
| 5,167,897 | A * | 12/1992 | Weber et al. | 264/288.8 |
| 5,503,076 | A | 4/1996 | Yeo | |
| 5,711,832 | A | 1/1998 | Glaug et al. | |
| 5,910,224 | A | 6/1999 | Morman | |
| 5,914,084 | A | 6/1999 | Benson et al. | |
| 6,531,025 | B1 * | 3/2003 | Lender et al. | 156/277 |
| 6,706,649 | B2 | 3/2004 | Schwinn | |
| 6,827,806 | B2 | 12/2004 | Ultenbroek et al. | |
| 6,875,710 | B2 | 4/2005 | Eaton et al. | |
| 7,056,411 | B2 | 6/2006 | Desai et al. | |
| 2002/0115817 | A1 * | 8/2002 | Hayes | 528/295.3 |
| 2002/0155266 | A1 * | 10/2002 | Stofko et al. | 428/216 |
| 2003/0087059 | A1 | 5/2003 | Jackson et al. | |
| 2003/0087089 | A1 * | 5/2003 | Rodriguez | 428/343 |
| 2003/0088228 | A1 * | 5/2003 | Desai et al. | 604/385.24 |
| 2003/0091807 | A1 | 5/2003 | Desai et al. | |
| 2003/0109842 | A1 | 6/2003 | St. Louis et al. | |
| 2004/0024109 | A1 * | 2/2004 | Hamersky et al. | 524/505 |
| 2004/0127881 | A1 | 7/2004 | Stevens et al. | |
| 2004/0222553 | A1 | 11/2004 | Desai et al. | |

FOREIGN PATENT DOCUMENTS

| | | | |
|---|---|---|---|
| WO | WO 01/87214 | A1 | 11/2001 |
| WO | WO 01/87588 | A2 | 11/2001 |
| WO | WO 02098999 | * | 12/2002 |
| WO | WO 03/039853 | A1 | 5/2003 |
| WO | WO 03/039868 | A1 | 5/2003 |
| WO | WO 03/053308 | A2 | 7/2003 |

* cited by examiner

METHOD OF GRAVURE PRINTING ELASTOMERIC COMPOSITIONS

CROSS REFERENCE TO RELATED APPLICATION

This application claims the benefit of U.S. Provisional Application No. 60/557,245, filed on Mar. 29, 2004.

FIELD OF THE INVENTION

This invention relates to a method of forming a stretch composite via gravure printing definitive elastomeric compositions onto a substrate. In certain embodiments, the composite is incrementally stretched to at least partially break up the structure of the substrate in order to reduce its resistance to stretch. The stretch composites are useful for disposable and durable articles, such as disposable absorbent articles including diapers, pull-on diapers, training pants, incontinence briefs, catamenial garments, baby bibs, and the like, and durable articles like garments including sportswear, outerwear and the like.

BACKGROUND

Disposable absorbent products like diapers typically include stretchable materials, such as elastic strands, in the waist region and the cuff regions to provide a snug fit and a good seal of the article. Pant-type absorbent articles further include stretchable materials in the side portions for easy application and removal of the article and for sustained fit of the article. Stretchable materials have also been used in the ear portions for adjustable fit of the article. The stretchable materials utilized in these diaper regions may consist of elastomeric films, nonwovens, strands, scrim, etc. Typically, these stretch regions are made separately and attached to the diaper using adhesives. In most cases, these designs deliver uniform and unidirectional stretch, most often in the lateral direction of the diaper.

An alternate approach that is capable of delivering multi-directional, non-uniform stretch has been disclosed in copending Serial application Ser. Nos. 10/288,095, 10/288,126 and 10/429,433. This approach involves hot melt printing of one or more thermoplastic elastomers onto a substrate, followed by incremental stretching of the printed substrate that then confers the stretch properties of the elastomer to the substrate in a somewhat magnified form. Suitable printing processes disclosed therein include direct gravure, offset gravure, and flexographic printing. Each of these printing methods allow deposition of any amount of an elastomer in any shape and direction, thus giving a wide variety of design flexibility which ultimately results in improved fit of the overall diaper product.

In the gravure printing process, a hot melt elastomer is delivered to the cells (also referred to as “grooves”) in a gravure roll via a bath, a slot coater, a sprayer or an extruder. The excess elastomer is doctored off from the roll and the elastomer is then transferred from the gravure cells to the substrate via a nip. Gravure printing is generally used for materials having viscosities less than about 5 Pa·s. Typically, from about 40% to about 60% of the elastomer in the cells is transferred to the substrate. It is understood in the art that the rationale for this diminished transfer is the failure in the gravure cells is cohesive, i.e., the elastomer in the gravure cells splits apart.

Without being limited by theory, it is therefore important to understand the mechanism of transfer of an elastomer from an application means to a substrate. During this transfer, three forces are relevant. These forces include: i) the adhesive force between the surface of the application means and the elastomer; ii) the cohesive strength of the elastomer (i.e., the resistance of a single portion of an elastomeric composition to separation into two smaller portions); and iii) the adhesive force between the elastomer and the substrate and/or the strength of the substrate. In order to successfully transfer an elastomer to a substrate either one or both of the cohesive strength of the elastomer or the adhesive force between the elastomer and the surface of the application means must be less than the adhesive force between the elastomer and the substrate and/or the strength of the substrate. Typically, this problem has been solved by the use of heated printing processes where the cohesive strength of the heated elastomer is at a sufficiently low value because the elastomer has been maintained in a liquid or semi-liquid state. Thus, transfer of an elastomeric composition from an application means to a substrate typically is achieved through cohesive failure of the elastomer at the point of transfer from the application means to the substrate and a portion of the elastomer remains on the surface of the application means. The above conditions generally apply during, for example, gravure printing of elastomeric adhesives, where the viscosity is relatively low and the adhesive has strong affinity for the walls of the gravure elements and also the substrate. Importantly, cohesive failure means that there is a residual portion of adhesive on the application means that is not transferred.

On the other hand, elastomeric compositions that have good elasticity generally have a higher viscosity at a given temperature than a typical elastomeric adhesive. For reference, typical thermoplastic elastomers used in diapers have viscosities in excess of 1000 Pa at 175° C. Increased viscosity translates into a higher cohesive force of the elastomer and a need to heat to a higher application temperature to insure cohesive failure. Such a dynamic poses a problem for conventional direct gravure printing of high viscosity materials, since a point is reached when the cohesive strength of the elastomer either exceeds its adhesive strength with the substrate or it exceeds the strength of the substrate. Such conditions, in turn, result in either a failure of the elastomer to bond to the substrate or damage to the substrate. On the other hand, if temperature is increased to lower cohesive strength, the application temperature of the elastomeric composition may exceed the melting point of the substrate with resulting substrate damage or thermal degradation of the elastomer. Thus, there is a need for an application process that is capable of depositing high viscosity elastomeric compositions on substrates, without damaging these substrates.

Applicants have surprisingly found that printing of high viscosity elastomeric materials would be possible if the conditions during printing are such that the failure inside the gravure cells is adhesive, rather than cohesive, i.e. the adhesive force between the roll and the elastomer is less than the cohesive force of the elastomer and also less than the adhesive force between the elastomer and the substrate. This can be accomplished by one or more of the following: i) using a non-adhesive elastomer that better releases from the cells in the gravure roll; ii) improving the release properties of the gravure roll via providing a release agent, a smoother surface like chrome plating on steel, etc.; iii) increasing the elastomer viscosity, i.e. cohesive strength; and iv) maintaining the gravure roll at a cooler temperature versus the elastomer delivery temperature.

For some materials, when the failure is adhesive, the peel force needed to peel the elastomer from the gravure roll is much lower than when the failure is cohesive. See, Gent and Petrich, *Adhesion of Viscoelastic Materials to Rigid Substrates*, Proc. Roy. Soc. A, vol. 310, pp. 433-448 (1969). Also, when the failure is adhesive (also referred to as interfacial failure by Gent and Petrich), the peel force needed to peel off the elastomer from the gravure roll is almost independent of viscosity. This a significant benefit, since this process would work even for very high viscosity materials.

When the failure during cell transfer is adhesive, almost all the elastomer is removed from the cells. This substantially complete removal of the elastomer has several advantages over and above the main advantage of high-viscosity printing. First, charring, which is a significant issue with unsaturated elastomers remaining in the dead zones inside the gravure cells, is virtually eliminated. Second, the transfer is uniform since the exact amount deposited within the cells is transferred out each time.

In view of the above outlined approaches, Applicants have determined that a viable approach to increasing the viscosity, and hence the cohesive strength, of the elastomer during cell transfer would be by running the gravure roll significantly cooler than the elastomer delivery temperature.

SUMMARY OF THE INVENTION

The present invention relates to a process of manufacturing a stretch composite, said method comprising:

a) providing a first substrate in a machine direction, wherein said substrate has opposing first and second surfaces;

b) providing a gravure printing roll having an exterior surface that comprises one or more cells wherein at least a portion of the surface is relatively cool;

c) depositing a molten, non-adhesive, elastomeric composition onto the exterior surface of the gravure printing device which comprises a gravure printing roll, wherein said composition is characterized as having a peel force of less than about 3 N/cm;

d) causing said composition to be pushed into said cells; and e) contacting said first surface of said substrate with said gravure printing roll and substantially completely transferring said elastomeric composition from said cells of said exterior surface on said gravure printing roll to said first surface wherein said process is substantially free of tackifier.

In another embodiment, the present invention relates to a process of manufacturing a stretch composite, said method comprising the steps of:

a) providing a first substrate in a machine direction, wherein said substrate has opposing first and second surfaces;

b) providing a gravure printing device comprising a gravure printing belt having an exterior surface that comprises grooves on said surface, wherein at least a portion of the surface is relatively cool;

c) depositing a molten, non-adhesive elastomeric composition onto the exterior surface of the gravure printing belt, wherein said composition is characterized as having a peel force of less than about 3 N/cm;

d) causing said composition to be pushed into said grooves; and e) contacting said first surface of said substrate with the exterior surface of said gravure printing belt and substantially completely transferring said elastomeric composition from said grooves on said gravure printing belt to said first surface; and wherein said process is substantially free of tackifier.

BRIEF DESCRIPTION OF THE DRAWINGS

While the specification concludes with claims particularly pointing out and distinctly claiming the subject matter that is regarded as the present invention, it is believed that the invention will be more fully understood from the following description taken in conjunction with the accompanying drawings, in which:

Figure 1:
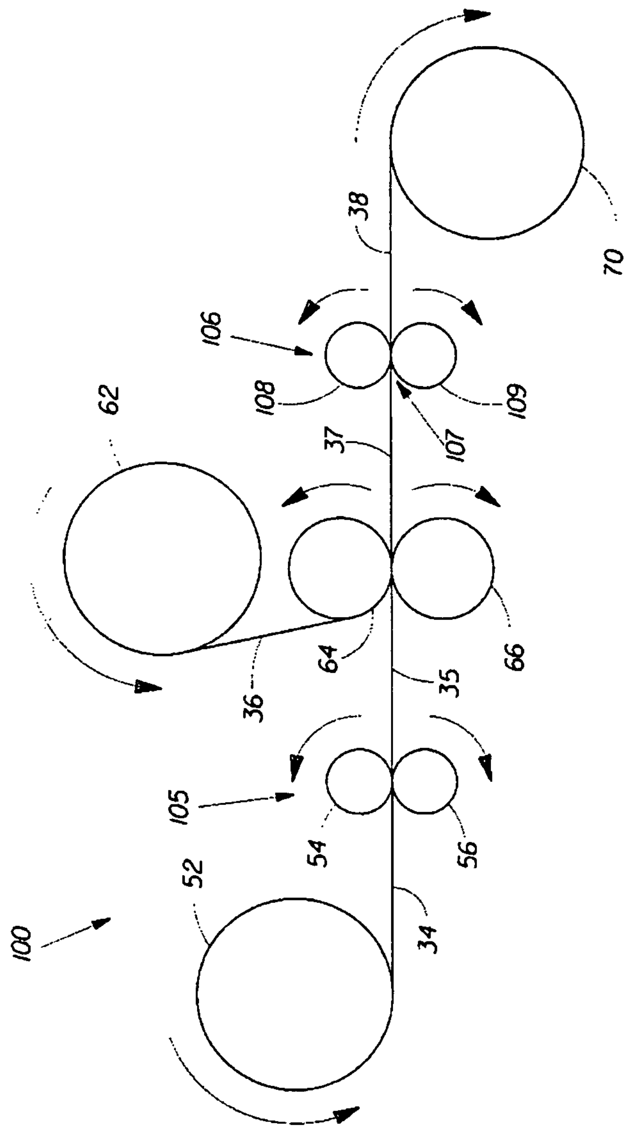
FIG. 1 is a schematic illustration of a representative process of the present invention.

FIG. **4*a*** is a perspective view of a sample holder used in the Peel Test.

FIG. **4*b*** is a perspective view of a clamp used in the peel test.

DETAILED DESCRIPTION

The term “disposable” as used herein refers to products which generally are not intended to be laundered or otherwise restored or extensively reused in their original function, i.e., preferably they are intended to be discarded after about 10 uses, or more preferably after about 5 uses, or even more preferably after about a single use. It is preferred that such disposable articles be recycled, composted or otherwise disposed of in an environmentally compatible manner.

The term “disposable absorbent article” as used herein refers to a device that normally absorbs and retains fluids. In certain instances, the phrase refers to devices that are placed against or in proximity to the body of the wearer to absorb and contain the excreta and/or exudates discharged from the body, and includes such personal care articles as fastened diapers, pull-on diapers, training pants, swim diapers, adult incontinence articles, feminine hygiene articles, and the like. In other instances, the term also refers to protective or hygiene articles, for example, bibs, wipes, bandages, wraps, wound dressings, surgical drapes, and the like.

The term “adhesive” refers to materials that, when evaluated according to the peel test described in the TEST METHODS section below have a peel force less than about 3 N/cm.

The term “fibrous substrate” as used herein refers to a material comprised of a multiplicity of fibers that could be either a natural or synthetic material or any combination thereof, for example, nonwoven webs, woven webs, knitted fabrics, and any combinations thereof.

The term “substrate” as used herein refers to a material that includes either a natural or synthetic material or any combination thereof, for example, nonwoven webs, woven webs, knitted fabrics, films, film laminates, nonwoven laminates, sponges, foams, and any combinations thereof.

The term “nonwoven” as used herein refers to a material made from continuous and/or discontinuous fibers, without weaving or knitting, by processes such as spun-bonding, carding and melt-blowing. The nonwoven webs can comprise one or more nonwoven layers, wherein each layer can include continuous and/or discontinuous fibers. Nonwoven webs can also comprise bicomponent fibers, which can have shell/core, side-by-side, or other known fiber structures.

The term “elastic” or “elastomeric” as used herein refers to any material that upon application of a biasing force, can stretch to an elongated length of at least about 160 percent of its relaxed, original length, without rupture or breakage, and upon release of the applied force, recovers at least about 55% of its elongation, preferably recovers substantially to its original length that is, the recovered length being less than about 120 percent, preferably less than about 110 percent, more preferably less than about 105 percent of the relaxed original length.

The term "inelastic" refers herein to any material that does not fall within the definition of "elastic" above.

The term "elastomer" as used herein refers to a polymer exhibiting elastic properties.

The term "extensible" or "inelastically elongatable" refers herein to any material that upon application of a biasing force to stretch beyond about 110 percent of its relaxed original length will exhibit permanent deformation, including elongation, rupture, breakage, and other defects in its structure, and/or changes in its tensile properties.

The term "necked material" refers to any material that has been narrowed in one direction by the application of a tensioning force.

The processes of manufacturing a stretch composite that is disclosed and claimed herein includes the steps of: a) providing a substrate in a machine direction, wherein said substrate has opposing first and second surfaces; b) providing a gravure printing device comprising gravure printing roll having an exterior surface that comprises one or more cells (or alternatively, a gravure printing belt having an exterior surface that comprises grooves on said surface and wherein at least a portion of the surface is relatively cool; c) depositing a molten, non-adhesive, elastomeric composition onto the exterior surface of the gravure printing roll (or belt), wherein said composition is characterized as having a peel force of less than about 3 N/cm; d) causing said composition to be pushed into said cells or said grooves; and e) contacting said first surface of said substrate with said gravure printing roll or belt and substantially completely transferring said elastomeric composition from said cells (or grooves) of said exterior surface on said gravure printing roll (or said belt) to said first surface; and wherein said process is substantially free of tackifier.

Any substrate (i.e., a first substrate or any additional substrate layers) that is suitable for use in the presently claimed processes includes a first and second surface and may be selected from the group consisting of films, knitted fabric, woven fibrous webs, nonwoven fibrous webs, or combinations thereof. In some embodiments, the substrate is an extensible nonwoven web that comprises polyolefin fibers and/or filaments, such as polyethylene, polypropylene, etc. The substrate can also be a nonwoven-film laminate, which for example, may be used as the outercover of a disposable diaper, training pant, adult incontinence product, etc. Ideally, the substrate shall range in thickness from about 0.05 mm to about 2 mm, preferably from about 0.1 mm to about 1 mm, and most preferably, from about 0.1 mm to about 0.5 mm.

Next, the present invention requires the use of a gravure printing device which comprises either a gravure printing roll or gravure printing belt. In the instance a roll is employed, the roll has an exterior surface that comprises one or more cells (or grooves) whereas the exterior surface of a printing belt, which is preferably thin (thickness of at least about 0.0127 cm) comprises one or more grooves. In each instance, the cells or grooves are indentations on the surface of the implement that permit receiving a liquid material (in this case an elastomeric composition) that is intended for transfer from the exterior surface to another surface (which is the substrate). It has been found that providing at least a portion of the exterior surface that is relatively cool in comparison to the delivery temperature of the elastomeric composition aids in increasing the viscosity and consequently the cohesive strength of the elastomeric composition during transfer of the material to the substrate. As used herein, "relatively cool" means that such a portion of the exterior surface is at least 10° C. cooler, preferably, 25° C. cooler, and most preferably, 50° C. cooler than the delivery temperature of the elastomer to the exterior surface. When a belt is employed it is important that the belt is capable of being heated and cooled relatively quickly so that the process can run at a reasonable speed for commercial operation.

Once a gravure printing roll or belt is provided, a molten, non-adhesive, elastomeric composition is deposited onto the exterior surface of the gravure printing roll or belt from a delivery mechanism which may be selected from the group consisting of a slot coater, a bath, a sprayer, and an extruder. In both instances, however, the elastomeric composition is deposited on the roll or belt after a heated portion and removed from the roll or belt after the relatively cool portion. The elastomeric composition of the present invention is characterized as having a peel force of less than about 3 N/cm, more preferably, less than about 2 N/cm, even more preferably, less than about 1 N/cm, and most preferably, less than about 0.8 N/cm. (The methodology used to determine the peel force of these elastomeric compositions is discussed in the TEST METHODS section below). Such relatively low peel force is believed important to achieving substantially complete transfer onto a substrate from a pattern roll or belt in order to minimize adhesive forces with the pattern roll or belt.

Suitable elastomeric compositions comprise thermoplastic elastomers selected from the group consisting of styrenic block copolymers, metallocene-catalyzed polyolefins, polyesters, polyurethanes, polyether amides, and combinations thereof. Suitable styrenic block copolymers may be diblock, triblock, tetrablock, or other multi-block copolymers having at least one styrenic block. Exemplary styrenic block copolymers include styrene-butadiene-styrene, styrene-isoprene-styrene, styrene-ethylene/butylene-styrene, styrene-ethylene/propylene-styrene, and the like. Commercially available styrenic block copolymers include KRATON® from the Shell Chemical Company of Houston, Tex.; SEPTON® from Kuraray America, Inc. of New York, N.Y.; and VECTOR® from Dexco Chemical Company of Houston, Tex. Commercially available metallocene-catalyzed polyolefins include EXXPOL® and EXACT® from Exxon Chemical Company of Baytown, Tex.; AFFINITY® and ENGAGE® from Dow Chemical Company of Midland, Mich. Commercially available polyurethanes include ESTANE® from Noveon, Inc., Cleveland, Ohio. Commercial available polyether amides include PEBAX® from Atofina Chemicals of Philadelphia, Pa. Commercially available polyesters include HYTREL® from E. I. DuPont de Nemours Co., of Wilmington, Del.

The elastomeric compositions may further comprise processing aids and/or processing oils to adjust the melt viscosity of the compositions. They include the conventional processing oil, such as mineral oil, as well as other petroleum-derived oils and waxes, such as paraffinic oil, naphthenic oil, petrolatum, microcrystalline wax, paraffin or isoparaffin wax. Synthetic waxes, such as Fischer-Tropsch wax; natural waxes, such as spermaceti, carnauba, ozokerite, beeswax, candelilla, ceresin, esparto, ouricuri, rezowax, and other known mined and mineral waxes, are also suitable for use herein. Olefinic or diene oligomers and low molecular weight resins may also be used herein. The oligomers may be polypropylenes, polybutylenes, hydrogenated isoprenes, hydrogenated butadienes, or the like, with a weight average molecular weight between about 350 and about 8000.

In one embodiment, a phase change solvent is used as the processing aid. It can be incorporated into the elastomeric composition to lower the melt viscosity, rendering the composition processable at a temperature of 175° C. or lower, without substantially compromising the elastic and mechanical properties of the composition. Typically, the phase change solvent exhibits a phase change at temperatures ranging from about 40° C. to about 250° C. The phase change solvent has the general formula:

$R'\text{-}Ly\text{-}(Q\text{-}L_x)_{n\text{-}1}\text{-}Q\text{-}L_y\text{-}R;$ (I)

$R'\text{-}L_y\text{-}(Q\text{-}L_x)_n\text{-}R;$ (II)

$R'\text{-}(Q\text{-}L_x)_n\text{-}R;$ (III)

$R'\text{-}(Q\text{-}L_x)_{n\text{-}1}\text{-}Q\text{-}L_y\text{-}R;$ (IV)

$R'\text{-}(Q\text{-}L_x)_{n\text{-}1}\text{-}Q\text{-}R;$ or (V)

a mixture thereof;

wherein Q may be a substituted or unsubstituted difunctional aromatic moiety; L is $CH_2$; R and R' are the same or different and are independently selected from H, CH3, COOH, $CONHR_1$, $CONR_1R_2$, $NHR_3$, $NR_3R_4$, hydroxy, or C1-C30 alkoxy; wherein $R_1$, $R_2$, $R_3$ and $R_4$ are the same or different and are independently selected from H or linear or branched alkyl from C1-C30; x is an integer from 1 to 30; y is an integer from 1 to 30; and n is an integer from 1 to 7. Detailed disclosure of the phase change solvents can be found in U.S. Serial application Ser. No. 10/429,432, filed on Jul. 2, 2003.

In some embodiments, the weight ratio of thermoplastic elastomer to processing oil or processing aid (e.g., a phase change solvent) in the elastomeric composition typically ranges from about 10:1 to about 1:2, preferably from about 5:1 to about 1:1, and more preferably about 2:1 to about 1:1.

The Q moieties in a phase change solvent may include terephthalic, naphthalic, phenolic, phenyl, or biphenyl having the following formula:

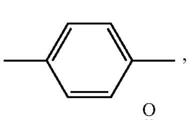
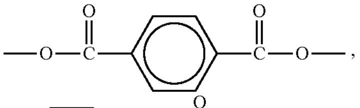
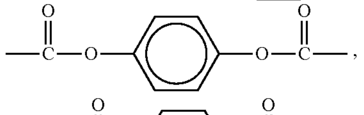
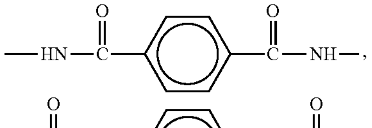
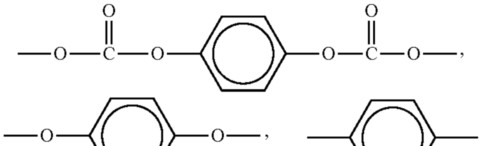
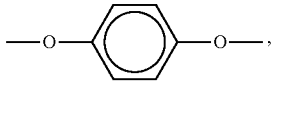
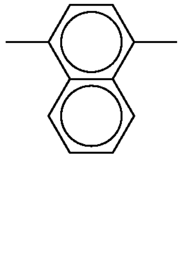

-continued

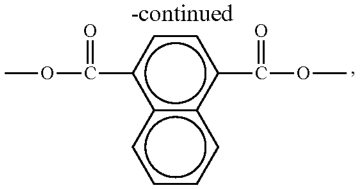
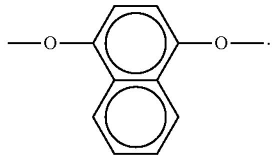

and the like, and mixtures thereof;

Q may be substituted on the aromatic ring with one or more substituents selected from H, C1-C30 alkyl, COOH, $CONHR_5$, $CONR_5R_6$, $NHR_7$, $NR_7R_8$, hydroxyl, C1-C30 alkoxy, $SO_3H$ or halogen; wherein $R_5$, $R_6$, $R_7$ and $R_8$ are the same or different and are independently selected from H or linear or branched alkyl from C1-C30.

In certain embodiments, Q is a para-ring substituted difunctional aromatic moiety, wherein the substitutions are in the 1,4 positions. In certain embodiments, n is an integer from 3 to 7.

In addition the elastomeric composition can comprise stabilizers and the like. For example, stabilizers can include both antioxidants and light stabilizers. Suitable antioxidants include sterically hindered phenolics. A commercially available antioxidant suitable for use in the elastomeric compositions of the present invention is IRGANOX 1010 available from Ciba Specialty Chemicals North America of Tarrytown, N.Y. Suitable light stabilizers include hindered amine light stabilizers. A commercially available ultraviolet light stabilizer is TINUVIN 123 also available from Ciba Specialty Chemicals North America.

The elastomeric compositions suitable for use with the present invention are also substantially tackifier free in order to help insure that adhesive failure at the pattern roll surface can be reliably achieved. As used herein the term "substantially tackifier free" is intended to mean that the elastomeric composition has less than about 5% by weight of a material commonly recognized in the adhesive arts as a tackifier. As is well known, tackifiers are added to adhesive formulations in order to increase the adhesion thereof. Materials having commercial utility as tackifiers include: rosin resins, cumarone-indene resins, terpene resins and hydrocarbon resins. Example 1 compares the release properties of suitable elastomeric compositions with prior art elastomeric adhesives.

In certain embodiments, the non-adhesive elastomeric compositions of the presently claimed processes are substantially free of release agents as well. In particular, "substantially free" as used relative to this ingredient means that the elastomeric composition as well as the overall process involves less than about 5% by weight of a release agent, preferably less than about 3%, and even more preferably less than about 1%.

Alternatively, the elastomeric composition may also comprise low molecular weight elastomers and/or elastomeric precursors of the above thermoplastic elastomers, and optional crosslinkers, or combinations thereof. For example, the thermoplastic elastomers described in copending U.S. patent application Ser. No. 10/610,605, filed in the name of Ashraf, et al. on Jul. 1, 2003 that comprise an elastomeric block copolymer having least one hard block and at least one soft block, a macro photoinitiator, a processing oil, and optionally, a thermoplastic polymer and/or a crosslinking agent contain such a precursor. The weight average molecular weight of the low molecular weight elastomers or elastomeric precursors is between about 45,000 and about 150,000. In some embodiments, the weight ratio between thermoplastic elastomer to low molecular weight elastomers or elastomeric precursors to the thermoplastic elastomers in the composition typically ranges from about 10:1 to about 1:2, preferably from about 5:1 to about 1:1, and more preferably about 2:1 to about 1:1.

Suitable elastomeric compositions for use herein form elastomeric members that are elastic without further treatment and these elastomeric compositions do not include any volatile solvents with boiling point below 150° C. After the elastomeric composition has been applied to the substrate, however, post-treatments may be used to improve or enhance the elasticity and other properties including strength, modulus, and the like of the resulting elastomeric members. Typically, post-treatments converting the elastomeric compositions into elastomeric members by methods such as cooling, crosslinking, curing via chemical, thermal, radiation means, pressing between nip rolls, and combinations thereof.

Without being limited by theory, in the case of gravure printing of elastomeric materials, oftentimes when the failure is adhesive, the peel force needed to peel the elastomer from the gravure roll is much lower than when the failure is cohesive. See, Gent and Petrich, *Adhesion of Viscoelastic Materials to Rigid Substrates*, Proc. Roy. Soc. A, vol. 310, pp. 433-448 (1969). Also, when the failure is adhesive (also referred to as interfacial failure), the peel force needed to peel off the elastomer from the gravure roll is almost independent of viscosity, which is quite beneficial especially in the case of high viscosity materials. In these instances, almost all of the elastomer is removed from the cells such that transfer is substantially complete. As used herein "substantially complete" or "substantially completely" means that no more than about 10%, more preferably, no more than about 7.5%, and most preferably, no more than about 5%, of the elastomeric composition is left untransferred to the substrate from the gravure printing device, i.e., the roll or the belt. This substantially complete transfer is quite advantageous. First, charring, which is a significant issue with unsaturated elastomers remaining in the dead zones inside gravure cells or grooves is eliminated. Second, the transfer is uniform since the same amount is transferred out of the cells or grooves each time.

Temperature may be raised to lower the viscosity of the elastomeric composition. High temperatures, however, may have an adverse effect on the stability of the substrate, which may experience partial or local thermal degradation where the heated elastomeric composition is deposited. A balance between these two effects is desirable. Alternatively, indirect/transfer methods, such as off gravure printing, may be used. The elastomeric composition is heated to achieve a suitable viscosity for processing and applied to an intermediate surface (e.g., a transfer roll or a carrier substrate) having good thermal stability, which is then transferred to the substrate. The indirect/transfer method allows for a wider range of operating temperatures because the fluid or fluid-like elastomeric composition is partially cooled when it contacts the substrate. Thus, the indirect process may be useful for substrates that are thermally sensitive or unstable, such as nonwoven webs, or substrates of low melting polymers, including polyethylene and polypropylene. Preferably, as the elastomeric composition is being transferred from the carrier surface to the substrate, it is still in a fluid phase or has sufficient flowability to at least partially penetrate the substrate at least at some locations. Additionally, nip pressure may be applied via nip rolls or calendar rolls to enhance penetration and bonding.

It is desirable to have the elastomeric composition at least partially penetrate the substrate at least in some locations, so that the resulting intermediate structure does not delaminate in the subsequent processing or manufacturing steps or in the finished product. Additionally, such good bonding within the composite and/or its preform renders the use of adhesives optional. The degree of penetration may be affected by several factors: the viscosity of the elastomeric composition when in contact with the substrate, the porosity of the substrate, and the surface tension between the substrate and the elastomeric composition. In one embodiment, the off-set gravure printing process allows partial cooling of the elastomeric composition before it contacts the substrate, and thus increases its viscosity and decreases the degree of penetration into the substrate. Alternatively, the elastomeric composition may be cooled by blowing chilled air/gas onto it prior to or while coming into contact with the substrate. In another embodiment, the degree of penetration may be enhanced by passing the substrate/elastomeric composition through a pair of nip rolls. The temperature of the nip rolls as well as the applied nip pressure provide further control of the degree of penetration. In some case, it may be desirable to enhance penetration only in some areas of contact between the fibrous web and the elastomeric materials. This can be accomplished with the use of a patterned, instead of smooth, backup roll during printing. For example, the backup roll can have longitudinal (MD) cells or grooves.

In certain embodiments, it is possible to vary the amount of elastomeric composition deposited in different portions of the substrate, thereby varying the local stretch properties. For example, by incorporating different depth and/or width of cells on the roll or grooves on the belt, the resulting elastomeric members can be thicker in one area and thinner in another area. In another example, by changing the pattern on the gravure printing roll or belt, the resulting elastomeric members can exhibit varying member densities (i.e., numbers of elastomeric members per unit area) from one area to another area of the composite. Furthermore, two or more gravure printing rolls, with different elastomeric compositions in each, can also be used to deposit these elastomeric compositions in different portions of the substrate.

Furthermore, it is also possible to combine different deposition processes, for example, gravure printing with spraying or flexo printing, to obtain the desired properties in the resulting stretch composites.

The stretch property of the substrate once printed can be varied discretely, that is, the property changes in a stepwise manner. An example of such stepwise change would be to apply a high performance elastomer in one portion of an element (such as the top part of an ear portion of a diaper) and a lower performance elastomer in another portion of that element (such as the lower part of the ear portion) where the stretch requirements are less demanding. The stretch property can also be varied continuously, either linearly or non-linearly. The continuous changes in stretch property may be achieved by a gravure pattern designed in such a way that the groove depth decreases gradually along the length of the groove, thus resulting in a printed pattern where the amount of deposited elastomeric composition decreases continuously from one end of the elastic member to the other.

The process 100 of manufacturing the stretch composite, one embodiment of which is illustrated schematically in FIG. 1, may include a primary operation of making an intermediate structure, which includes the steps of supplying a first substrate; applying an elastomeric composition or material to the first extensible substrate; and optionally joining with a second substrate. Process 100 may optionally include a secondary operation of incrementally stretching the printed substrate to provide additional extensibility to the substrate.

Figure 2:
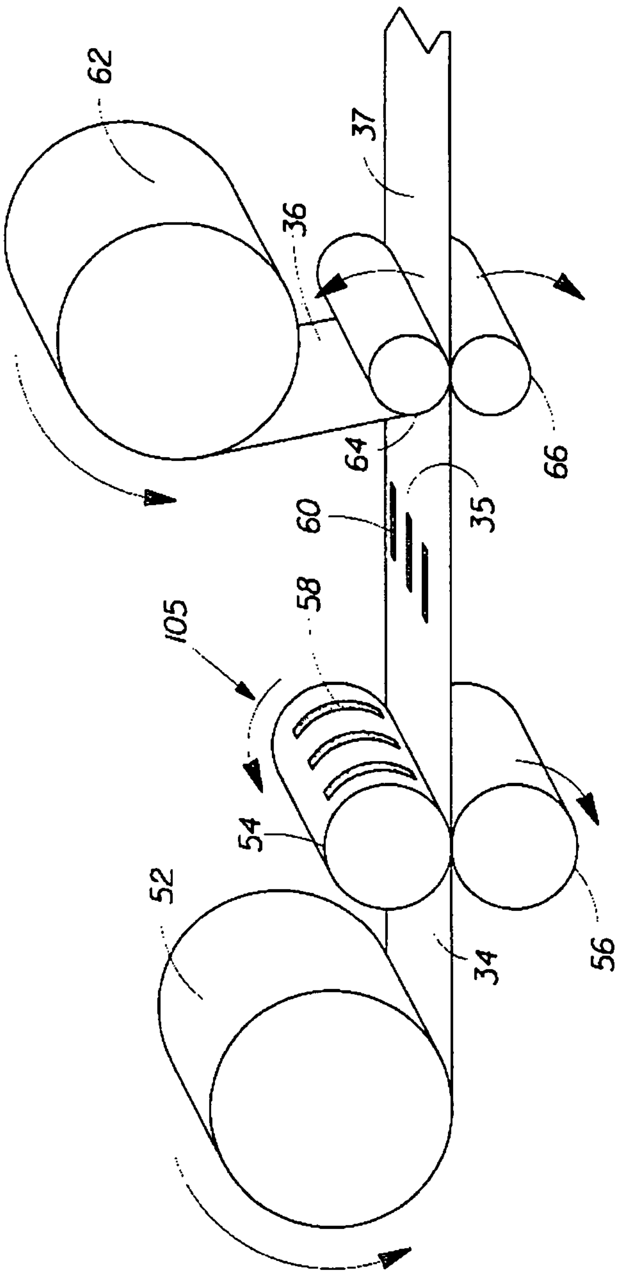
FIG. 2 is an enlarged perspective view of a primary operation of the present invention that includes applying elastomeric composition to a substrate and joining it with another substrate.

The primary operation of process 100 is shown in detail in FIG. 2. The substrate 34 is provided by a first supply roll 52 and moves through an gravure printing device 105 which comprises a gravure printing roll 54 and a back-up roll 56, that deposits the elastomeric composition for elastomeric members onto substrate 34. The elastomeric composition, being in a fluid or fluid-like state, may at least partially penetrate substrate 34 to provide a printed substrate 35, resulting in direct bonding between the elastomeric members and the substrate. Optionally, one or more additional substrates 36 may be provided by a second supply roll 62 and combined with the printed substrate 35 via nip rolls 64, 66 to sandwich the elastomeric members between substrates 34, 36 to form an intermediate structure 37. If necessary, adhesives may be used to bond the two substrates. At this point of the process, a zero strain laminate is produced wherein the elastomeric members and the substrates are bonded in an unstrained state.

The printed substrate 35 and/or the intermediate structure 37 may be subjected to additional treatments such as cooling, pressing (e.g., passing between a pair of nip rolls), crosslinking, curing (e.g., via chemical, thermal, radiation methods), and combinations thereof, to enhance the elastic and mechanical properties of the elastomeric composition deposited thereon and of the resulting intermediate structure.

Figure 3:
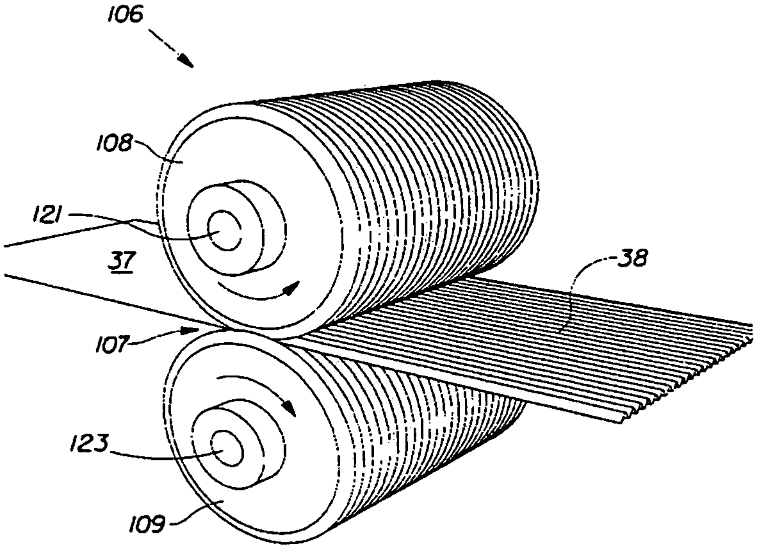
FIG. 3 is an enlarged perspective view of optional secondary operation of the present invention which uses interengaging forming rolls to incrementally stretch an intermediate structure.

An optional secondary operation of process 100 is shown in FIG. 3. This secondary operation includes a forming station 106 which incrementally stretches the intermediate structure 37 to the extent that the substrate is permanently elongated and intermediate structure 37 is converted into stretch composite 108. Due to this structural change, the substrate has a reduced resistance to stretch and the elastomeric members are able to stretch to the extent provided by the permanent elongation of the substrate.

A process sometimes referred to as "ring-rolling," may be a desirable incremental stretching operation of the present invention. In the ring rolling process, corrugated interengaging rolls are used to permanently elongate the substrate to reduce its resistance to stretch. The resulting composite has a greater degree of stretchability in the portions that have been subjected to the ring rolling process. Thus, this secondary operation provides additional flexibility in achieving stretch properties in localized portions of the stretch composite.

Methods for imparting stretchability to an extensible or otherwise substantially inelastic material by using corrugated interengaging rolls which incrementally stretch in the machine or cross-machine direction and permanently deform the material are disclosed in U.S. Pat. Nos. 4,116,892, 4,834,741, 5,143,679, 5,156,793, 5,167,897, 5,422,172, and 5,518,801. In some embodiments, the intermediate structure may be fed into the corrugated interengaging rolls at an angle with respect to the machine direction of this secondary operation. Alternatively, the secondary operation may employ a pair of interengaging grooved plates applied to the intermediate structure under pressure to achieve incremental stretching of the intermediate structure in localized portions.

Extensibility may also be imparted to the substrate via necking as described in U.S. Pat. Nos. 5,226,992 and 5,910,224, both assigned to Kimberly-Clark Worldwide, Inc. In this process, the substrate is necked in one direction by applying tension, and the elastomer is printed while the substrate is still in the necked state. If necessary, this laminate can be incrementally stretched to further enhance the stretch properties.

Another method of imparting extensibility is by consolidation as described in U.S. Pat. No. 5,914,084 and 6,114,263, both assigned to The Procter & Gamble Company. As described therein, consolidation involves feeding a neckable nonwoven in a first direction, subjecting the nonwoven to incremental stretching in a direction perpendicular to the first, applying a tensioning force to the nonwoven to neck the nonwoven, subjecting the nonwoven to mechanical stabilization to provide a stabilized, extensible, necked nonwoven. Additionally, the requisite incremental stretching may be achieved by a combination of the stretching techniques detailed herein. As with necking, this laminate can optionally be incrementally stretched to further enhance stretch properties.

It is desirable that the extensible substrate does not exhibit resistance to stretch when the composite is subjected to a typical strain under the in-use condition. The in-use strains experienced by the composite are due to the stretching when the article is applied to or removed from a wearer and when the article is being worn. The extensible substrate can be pre-strained to impart the desired stretchability to the composite. Typically, when the extensible substrate is pre-strained to about 1.5 times of the maximum in-use strain (typically less than about 250% strain), the extensible substrate becomes permanently elongated such that it does not exhibit resistance to stretch within the range of in-use strain and the elastic properties of the composite is substantially the same as the sum of the elastomeric members in the composite.

Suitable uses for the stretch composites that result from the processes of the present invention include disposable articles. Exemplary disposable articles include diapers, training pants, adult incontinence articles, sanitary napkins, garments like gloves, aprons, smocks, socks, etc. These disposable articles may comprise a stretch region that is selected from the group consisting of an ear, leg cuff, waist band, back panel, front panel, side panel, and combinations thereof, and these stretch regions comprise the stretch composites that are manufactured via the process of the present invention.

Test Methods

Peel Force Method

The peel force test measures the force required to peel an elastomeric composition in film form from a smooth stainless steel plate at room temperature.

Apparatus

Stainless Steel Plate (SS plate): M$^c$ Master Carr, catalog number 8983K62, conforms to ASTM A240 The smooth stainless steel plate is made of 304 stainless steel and has a #2B finish; width=100 mm, length=75 mm, thickness=0.060

Silicone Rubber Sheet: M$^c$ Master-Carr # 8979K111, high temperature silicone rubber, 1/32" thick, 49A Durometer Release Paper: Paul N. Gardner Company, catalog # PC-RP-1K, 8.63"×11.25", ASTM D 4708/2370/1353

Hand Roller: A suitable roller can be fabricated from a 68 mm diameter steel roll having a 6 mm thick coating of hard rubber (65 Shore A) thereon. The finished roll ahs a weight of 2250 grams and a width of 6.35 cm.

Mylar Film: At 2 mils (0.5 mm) thickness, this Mylar film should be slightly wider and longer than the elastomer in order to ensure that it fully covers it.

Tensile Tester: A suitable instrument is available from MTS Systems Corp. of Cary, N.C. as model Alliance RT/1.

Figure 4A:
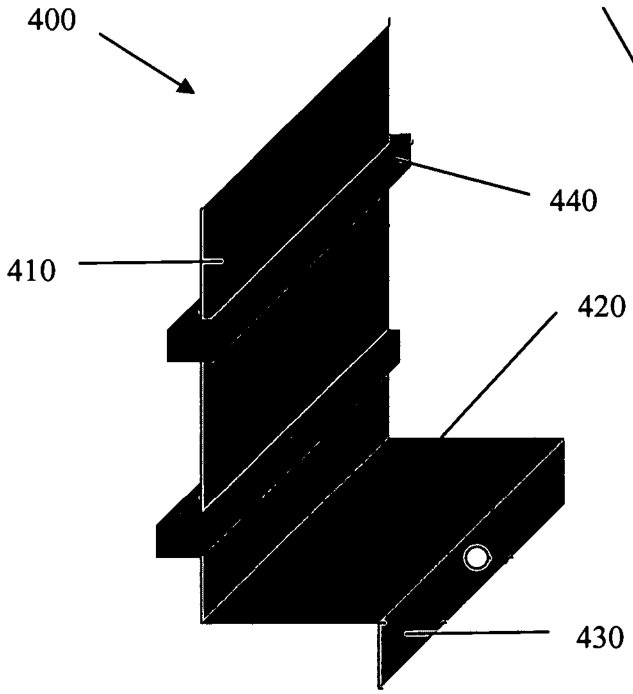

Sample Support: The support 400 used to hold the stainless steel plate during execution of this method is shown in FIG. 4*a*. It is a bent from a 120 mm×110 mm stainless steel plate so as to have the following dimensions:

Plate Width: 110 mm

First vertical portion 410-80 mm

Horizontal portion 420-25 mm

Second vertical portion 430-15 mm

Figure 4B:
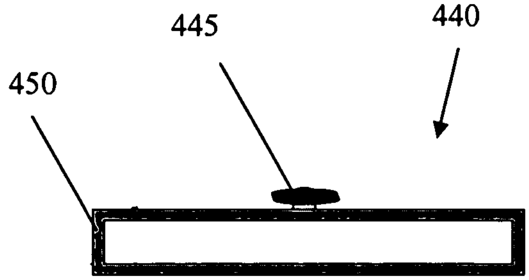

FIG. 4*b* shows one of a pair of clamps 440 used to insure that the stainless steel plate remains in stable contact with support 400 throughout the test. The clamps 440 may be conveniently made by bending 12 mm wide stainless steel into a rectangle 450 having a width of 111 mm (i.e., slightly wider than support 400)×5 mm deep. The clamps are also provided with a screw apparatus 445 for providing tension against the support 400.

Sample

Elastomeric Film: The film sample must have exactly the same composition as the elastomeric composition that is applied using the claimed process. Sample width is 2" (50.8 mm) wide by a minimum of 75 mm long by 14 mils±2 mils (0.356 mm±0.05 mm) thick The films are prepared by:

1) Weighing approximately 12 grams of the elastomeric composition of interest;
2) Compression molding the composition by placing the pre-weighed material between two pieces of 0.010 inch (0.03 mm) caliper PTFE (Teflon) film;
3) Placing the film "sandwich" between preheated aluminum plates that are inserted into a Carver Press model 3853-0 with heated plates set to approximately 160° C.;
4) Heating the material for 3 minutes and then pressing it between the plates with an applied pressure of 2500 psi;
5) The formulation is allowed to flow under pressure for 30 seconds;
6) Quenching the resulting film to ambient temperature; and
7) Cutting the film into three equal portions.
8) Each portion is placed between films of PTFE and preheated aluminum plates and allowed to heat up to 160° C. for 1 minute in the Carver press before 2,000 psi of pressure is applied.
9) The formulation is allowed to flow under this pressure for 30 seconds.
10) The pressure is removed and the sample is rotated 90° and inserted back into the press and immediately 3,000 psi of pressure is applied.
11) The formulation is again allowed to flow for 30 seconds. The pressure is removed and the sample is flipped and inserted back into the press and immediately 4,000 psi of pressure is applied.
12) The formulation is again allowed to flow for 30 seconds.
13) The pressure is removed and the sample is rotated 90° and inserted back into the press and immediately 5,000 psi of pressure is applied.
14) The formulation is again allowed to flow for 30 seconds.
15) After the final pressing, the film is quenched to ambient temperature.
16) If necessary, two or more plies of material prepared according to steps 1-15 are laminated by layering the plies and repeating steps 8-15 to achieve a final sample thickness of 0.36±0.05 mm.
17) The films are cut into proper sample size according to the test methods described hereinabove.

Method

1) Place the smooth stainless steel plate (SS plate) on a metal support plate.
2) Place the silicone rubber sheet adjacent to the smooth SS plate. This silicone rubber sheet should have about the same thickness as the smooth SS plate.
3) Place the sample of the elastomeric film of interest on the smooth SS plate such that it is at least 50 mm on the smooth SS plate and at least 25 mm on the silicone rubber sheet.
4) Place the release paper on top of the elastomeric film and apply pressure with the hand roller. The hand roller is rolled over the test sample 10 times (1 time=1 forward and 1 return movement). The pressure applied is just the weight of the hand roller.
5) Remove the release paper and put the test sample on a SS plate that is placed on a hot plate maintained at a temperature greater than the order/disorder temperature for the composition. It is necessary to heat the elastomer well above its order/disorder temperature in order to ensure that the elastomer is soft enough to bond with the smooth stainless steel plate. A temperature of 160° C. should be sufficient for most compositions of interest.
6) Heat the test sample on the hot plate for 10 minutes±1minute.
7) Remove the SS support plate along with the test sample and place it on a block of steel that is at room temperature.
8) Ten seconds after removal from the hot plate, place the Mylar film on the elastomer and apply pressure with the roller 10 times as before.
9) Allow the setup to cool down in air to room temperature.
10) Place the smooth SS plate, along with the elastomer and Mylar film, in the peel test grips on a tensile tester. The peel angle is 180° and the measurements are made at room temperature.
11) Peel off the elastomer from the smooth SS plate at 10 inches/minute. The load increases first and then reaches a steady value.
12) Record this constant peel force and report it in gram force/cm width of the elastomer.
13) Repeat for a total of at least 3 replicates.
14) Report the average peel force and the standard deviation of the recorded measurements.

Residual Elastomer

This method is intended to measure the amount of residual elastomer on the pattern roll and uses this data to determine residual elastomer. In principle, a fluorescent material is incorporated into the elastomeric composition of interest and a curve relating amount of the composition to fluorescence is created. This curve is then used to relate measurements of fluorescence to the amount of thermoplastic elastomer remaining on the raised surface elements.

Materials

Fluorescer: A suitable fluorescent material is available from UV Process Supply Inc. of Chicago, Ill.

Apparatus

Any suitable apparatus capable of providing appropriate illumination and measuring the intensity of the emitted light may be used. The apparatus should be as compact as possible within the constraint of the measurement requirements.

Fluorimiter: Capable of receiving and measuring the intensity of emitted light from the fluorescent material. The fluorimeter should include an appropriate optical filter tuned to the characteristic wavelength of the light emitted by the fluorescer.

Exciter: Capable of providing light at the characteristic wavelength that is most efficient for energy transfer to the fluorescer. The exciter should include an optical filter to define the wavelength of the light used to illuminate the fluorescer.

Sample

Elastomer: Take a sample of elastomer that is at least three times the estimated volume of the elastomer supply apparatus on the application system being evaluated.

Determination of Fluorescer Concentration

1. Prepare a 0.01% solution of the elastomer in a suitable solvent.
2. Prepare a known concentration solution of the fluorescer in the same solvent.
3. To aliquots of the elastomer solution add aliquots of the fluorescer solution so as to provide mixed solutions that are equivalent to 0.01% solutions of elastomer that has had fluorescer at concentrations of 0.1%, 0.5%, 1%, 2% and 5% added thereto.
4. Calibrate the fluorimeter and exciter according to the manufacturer's instructions.
5. Determine the intensity of emitted light from each of the mixed solutions ($I_{0.1}$-$I_{0.8}$).
6. Choose a fluorescer concentration that provides an acceptable signal to noise ratio.

Preparation of Elastomer

The elastomer and the fluorescer are compounded so as to thoroughly disperse the fluorescer in the elastomer at the lowest concentration necessary to achieve an acceptable signal to noise ratio as determined from the intensity/concentration curve. GLS Corporation of M$^c$ Henry, IL is a suitable compounder for this operation.

Preparation of Standard Fluorescence Curve

1. Dissolve portions of the compounded elastomer using the fluorescer concentration as determined above in a suitable solvent at concentrations of 0.01%, 0.05%, 0.1%, 0.5% and 1%.
2. Measure and record the intensity of the fluorescence from each sample using the fluorimeter
3. Repeat steps 1 and 2 for two additional sets of samples.
4. Plot a curve of the concentration vs. the average intensity at each concentration.

Residual Elastomer Determination

1. Remove the noncompounded elastomer from the elastomer supply apparatus.
2. Fill the elastomer supply apparatus with the compounded elastomer.
3. Start up the letterpress application system.
4. Run the letterpress adhesive application system under production operating conditions until at least two supply system volumes of compounded elastomer have been consumed.

At the completion of steps 1-4 and before the remainder of the compounded elastomer is consumed conduct the following measurements while the system is running under production operating conditions.

5. Retract the applicator roll so as to prevent transfer of elastomer from the applicator roll to the pattern roll.
6. Continue to run the process under production operating conditions with the applicator roll retracted for at least 20 revolutions of the pattern roll (approximately 10-30 seconds).
7. Conduct a controlled line shutdown.
8. Collect the product produced during the period in a manner that the sequence of products is maintained.
9. Choose a pattern for further evaluation. As used herein a "pattern" is a portion of the elastomeric composition that has been deposited on the surface of the substrate from one or more raised pattern elements wherein the elements are located on a specific portion of the pattern roll.
10. From the collected product, identify the first pattern produced where elastomer transferred thereto is visibly reduced. This pattern is indicative of the point in the process flow where the applicator roll was retracted.
11. Collect 20 individual patterns that were produced after the first pattern with a visible reduction in transferred elastomer being careful to maintain the patterns in production order.
12. Collect 20 individual products that were produced before the first pattern with a visible reduction in transferred elastomer being careful to maintain the products in production order.
13. Number the samples 1 to 41 with sample number 1 being the that pattern that was produced with the greatest duration of time before the applicator roll was retracted and sample 41 being that pattern that was produced with the greatest duration of time after the applicator roll was retracted. As will be recognized, sample 21 is the sample visually identified in step 8.
14. Extract, samples 1-25 using a suitable solvent.
15. Measure the intensity of the fluorescence of the extracts of each sample. If necessary, the extracts can be concentrated using known methods to increase the measured intensity.
16. Using samples 1-20, determine the process capability limits (mean intensity±3 standard deviations) of the application process for the pattern chosen.
17. Compare the intensity of sample 21 to the process capability limits. If the intensity of sample 21 is within the process capability limits, proceed to step 16. If not, move backward through (i.e., toward sample 1) the samples to determine the first sample having an intensity within the process capability limits.
18. For sample 21 (or alternative starting point as determined in step 15) and the next 5 samples in sequence determine the elastomer add-on (Add-On $Wt_{21}$-Add-On $Wt_{26}$) using the standard curve developed using the method described above.
19.

$$\text{Percent Residual} = \frac{\sum_{22}^{26} Add\text{-}OnWt_i}{\sum_{21}^{26} Add\text{-}OnWt_i} \times 100$$

20. Repeat Steps 5-15 three more times.
21. Report average Percent Residual Elastomer, the individual calculated Percent Residual Elastomer values and all data used to calculate them.

EXAMPLE 1

This example compares the properties of commercially available adhesives (elastomeric and nonelastomeric), a thermoplastic elastomer and exemplary non-adhesive elastomer compositions.

| Description | Peel Force (N/cm) | Type |
|---|---|---|
| H2737[1] | 5.54 | Adhesive |
| H2031[2] | 14.40 | Adhesive |

-continued

| Description | Peel Force (N/cm) | Type |
|---|---|---|
| Vector 4211[3] | 2.31 | Non-adhesive |
| First non-adhesive elastomer[4] | 0.23 | Non-adhesive |
| Second non-adhesive elastomer[5] | 0.16 | Non-adhesive |

[1]Elastomeric adhesive from Bostik Findley of Wauwatosa, WI
[2]Adhesive from Bostik Findley
[3]Styrene/isoprene/styrene block copolymer available from Dexco Polymers LP, Houston, TX
[4]Vector 8508[a] 20%
Low Molecular Weight Thermoplastic Elastomer[b] 50%
Drakeol 600[c] 25%
M Photoinitiator[d] 5%
[a]Styrenic block copolymer from Dexco Company, Houston, TX
[b]Experimental Styrenic-isoprene-styrene block copolymer from Dexco
[c]Mineral oil from Pennzoil Co., Penrenco Div., Karns City, PA
[d]Experimental sample from National Starch and Chemicals Bridgewater, NJ
[5]Septon 4033[a] 40%
SHF 401[b] 40%
Dioctyldodecylterephthalate oligimer 20%
[a]Styrenic block copolymer from Kuraray America, Inc. of New York, NY
[b]Poly α olefin synthetic oil from ExxonMobile Chemical Co., Huston, TX.

All documents cited in the Detailed Description of the Invention are, in relevant part, incorporated herein by reference; the citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process of manufacturing a stretch composite, said method comprising the steps of:

a) providing a first substrate in a machine direction, wherein said substrate has opposing first and second surfaces;

b) providing a gravure printing device which comprises a gravure printing roll having an exterior surface that comprises one or more cells wherein at least a portion of the surface is relatively cool;

c) depositing a molten, non-adhesive, elastomeric composition onto the exterior surface of the gravure printing roll;

d) causing said composition to be pushed into said cells; and e) contacting said first surface of said substrate with said gravure printing roll and substantially completely transferring said elastomeric composition from said cells of said exterior surface on said gravure printing roll to said first surface; and wherein said process is substantially free of tackifier and wherein said elastomeric composition comprises a thermoplastic elastomer and a phase change solvent having the general formula:

$$R'\text{—}L_y\text{-}(Q\text{-}L_x)_{n-1}\text{-}Q\text{-}L_y\text{-}R; \quad (I)$$

$$R'\text{—}L_y\text{-}(Q\text{-}L_x)_n\text{-}R; \quad (II)$$

$$R'\text{-}(Q\text{-}L_x)_n\text{-}R; \quad (III)$$

$$R'\text{-}(Q\text{-}L_x)_{n-1}\text{-}Q\text{-}L_y\text{-}R; \quad (IV)$$

$$R'\text{-}(Q\text{-}L_x)_{n-1}\text{-}Q\text{-}R; \text{ or} \quad (V)$$

a mixture thereof;

wherein Q is a para-ring substituted difunctional aromatic moiety, and wherein the substitutions are in the 1,4 positions; L is $CH_2$; R and R' are the same or different and are independently selected from H, $CH_3$, COOH, $CONHR_1$, $CONR_1R_2$, $NHR_3$, $NR_3R_4$, hydroxy, or $C_1$-$C_{30}$ alkoxy; wherein $R_1$, $R_2$, $R_3$ and $R_4$ are the same or different and are independently selected from H or linear or branched alkyl from $C_1$-$C_{30}$; x is an integer from 1 to 30; y is an integer from 1 to 30; and n is an integer from 3 to 7; wherein the phase change solvent has a phase change in a temperature range from 40° C. to about 250° C.

2. The process of claim 1 wherein the exterior surface of said gravure printing roll has a temperature that is at least 10° C. lower than the temperature of said elastomeric composition prior to deposition on the gravure printing roll.

3. The process of claim 1 wherein said composition is applied as a layer to said roll by a delivery mechanism selected from the group consisting of a slot coater, a bath, a sprayer, and an extruder.

4. The process of claim 1 wherein excess composition present on said printing roll is removed via a doctor blade.

5. The process of claim 1 wherein said elastomeric composition is crosslinked.

6. The process of claim 1 wherein said substrate is stretched in said machine direction so as to neck said substrate in a cross machine direction prior to transfer of said composition.

7. The process of claim 1 wherein said substrate is incrementally stretched after said transfer of said composition so as permanently elongate at least a portion thereof.

8. The process of claim 1 wherein a second substrate is contacted with said composition after said transfer of said composition.

9. The process of claim 1, wherein said elastomeric composition is characterized as having a peel force of less than about 3 N/cm.

10. The process of claim 1 wherein Q is selected from the group consisting of terephthalic, naphthalic, phenolic, phenyl and biphenyl having the following formulae:

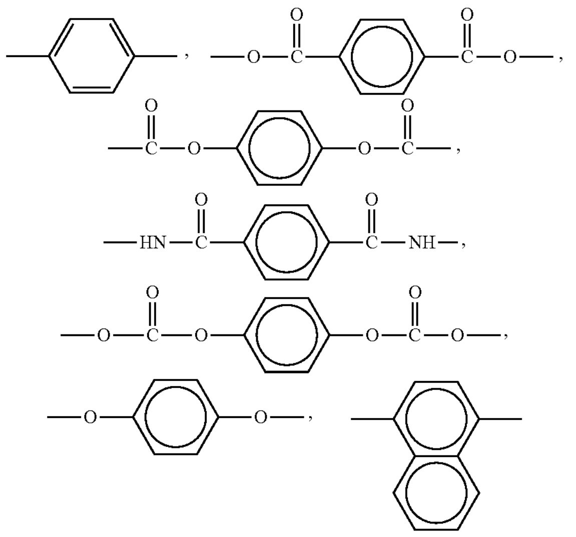

-continued

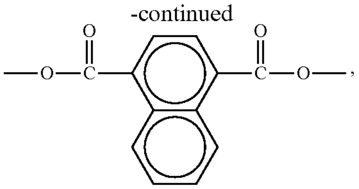

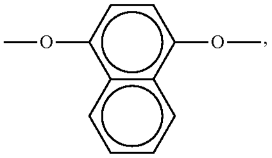

and mixtures thereof.

11. The process of claim 10 wherein Q is selected from terephthalic having the following formulae:

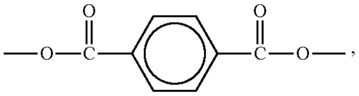

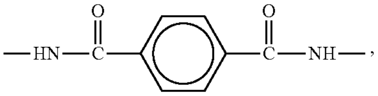

and mixtures thereof.

12. The process of claim 10 wherein Q is selected from naphthalic having the following formulae:

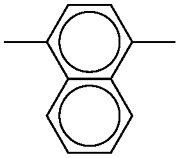

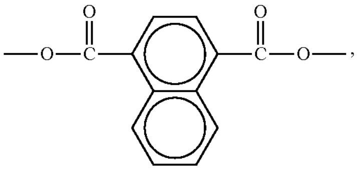

-continued

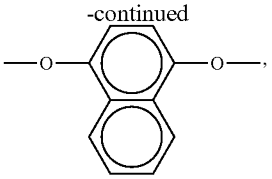

and mixtures thereof.

13. The process of claim 1 wherein Q is substituted on the aromatic ring with one or more substituents selected from H, $C_1$-$C_{30}$ alkyl, COOH, $CONHR_5$, $CONR_5R_6$, $NHR_7$, $NR_7R_8$, hydroxy, $C_1$-$C_{30}$ alkoxy, $SO_3H$, or halogen;

wherein $R_5$, $R_6$, $R_7$ and $R_8$ are the same or different and are independently selected from H or linear or branched alkyl from $C_1$-$C_{30}$.

14. The process of claim 9, wherein said elastomeric composition is characterized as having a peel force of less than about 2 N/cm.

15. The process of claim 14, wherein said elastomeric composition is characterized as having a peel force of less than about 1 N/cm.

16. The process of claim 15, wherein said elastomeric composition is characterized as having a peel force of less than about 0.8 N/cm.

17. The process of claim 2 wherein the exterior surface of said gravure printing roll has a temperature that is at least 25° C. lower than the temperature of said elastomeric composition prior to deposition on the gravure printing roll.

18. The process of claim 17 wherein the exterior surface of said gravure printing roll has a temperature that is at least 50° C. lower than the temperature of said elastomeric composition prior to deposition on the gravure printing roll.

19. The process of claim 1 wherein said thermoplastic elastomer is selected from the group consisting of styrenic block copolymers, metallocene-catalyzed polyolefins, polyesters, polyurethanes, polyether amides, and combinations thereof.

20. The process of claim 19 wherein said styrenic block copolymer is selected from the group consisting of styrene-butadiene-styrene, styrene-isoprene-styrene, styrene-ethylene/butylene-styrene, and styrene-ethylene/propylene-styrene.

* * * * *